Figure 1:
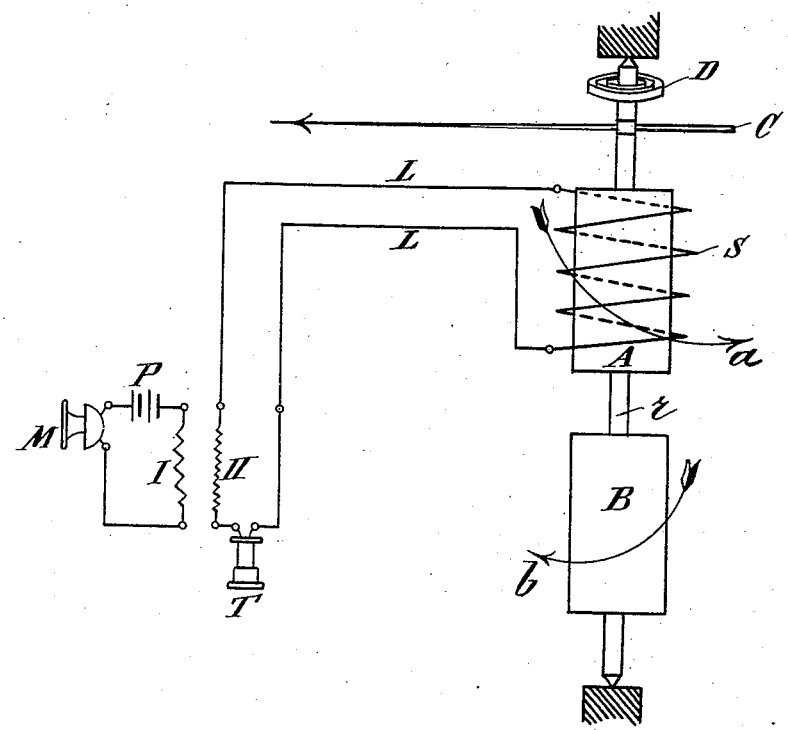

No. 855,220. PATENTED MAY 28, 1907.
R. ARNO.
ELECTRIC METER.
APPLICATION FILED JAN. 6, 1906.

2 SHEETS—SHEET 1.

Witnesses:
E. O. Hildebrand
May Taylor

Inventor:
Riccardo Arno
by Georgii Massie
Attorney

No. 855,220. PATENTED MAY 28, 1907.
R. ARNO.
ELECTRIC METER.
APPLICATION FILED JAN. 6, 1906.
2 SHEETS—SHEET 2.
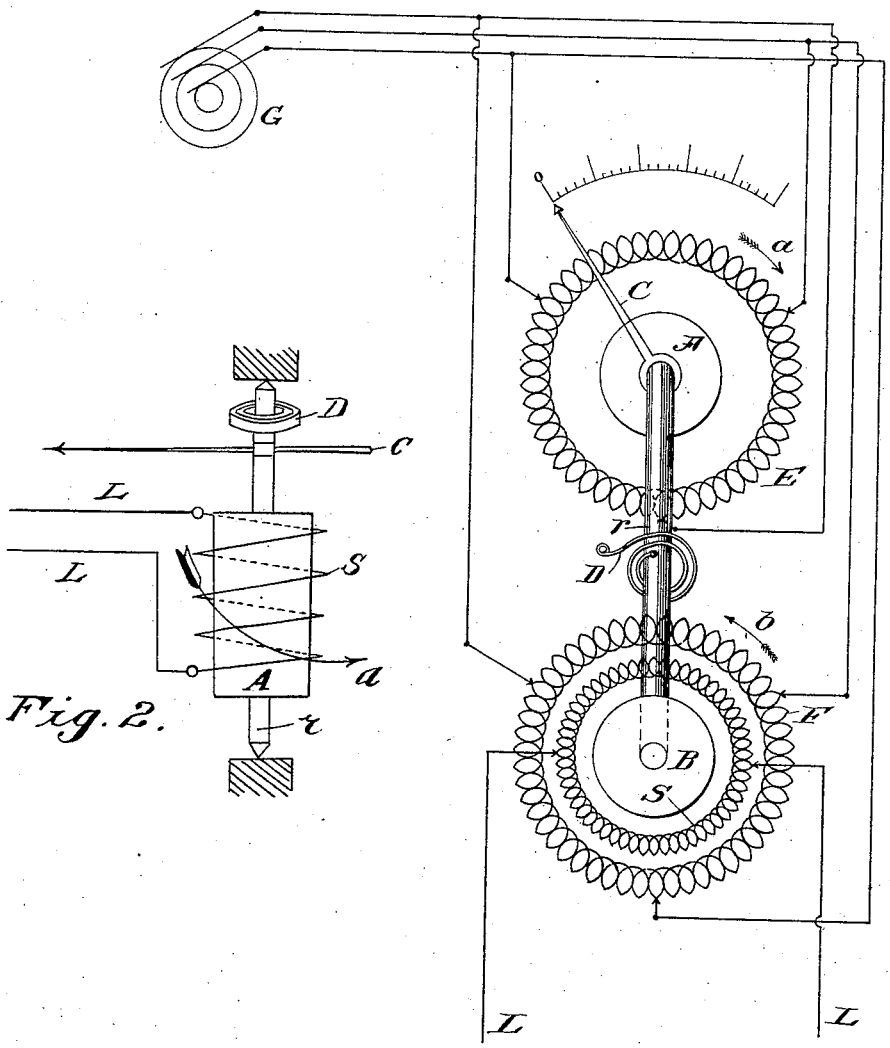

UNITED STATES PATENT OFFICE.

RICCARDO ARNO, OF MILAN, ITALY.

ELECTRIC METER.

No. 855,220.  Specification of Letters Patent.  Patented May 28, 1907.

Application filed January 6, 1906. Serial No. 294,904.

*To all whom it may concern:*

Be it known that I, RICCARDO ARNO, professor and electrical engineer, a subject of the King of Italy, residing at 2, via Quintino, Sella, Milan, Italy, have invented certain new and useful Improvements in Electric Meters; and I do hereby declare the following to be a full, clear, and exact description of the invention, such as will enable others skilled in the art to which it appertains to make and use the same.

My invention relates to electric meters and particularly to a method of indicating the presence and measuring the value of weak pulsating or variable currents. It is applicable to the measurement of telephonic currents, to those developed in living bodies as a result of physiological action, to currents produced by variations of temperature, by contact between heterogeneous bodies, by the influence of light or changing atmospheric conditions upon certain bodies, etc.

My invention is based upon the phenomenon that when a disk or cylinder of magnetic material is subjected to the influence of a rotary magnetic field, as for instance, that known as the Ferraris type, the magnetization of the disk will cause it to rotate in the direction of the rotating field, but with a certain amount of lag depending upon the magnetic properties of the disk. If now, an additional magnetic field produced by a varying current, such as an alternating or an interrupted current, even of an exceedingly small value, is superposed upon the rotating field, a variation in the motion of the disk instantly results, such variation usually appearing as an increased lag of the disk behind the rotating magnetic field. The amount of this lag or deviation from the normal operation of the disk which will be caused by the superposed field of an auxiliary current may be readily ascertained, since such deviation increases with the frequency of alternation or interruption of the auxiliary current.

My method is capable of being embodied in a number of different forms, but for the purpose of explaining its practical application I have illustrated in conventional form in the accompanying drawings, one type of measuring instrument.

Figures 1 and 2 are diagrams designed to illustrate the principle involved; and Fig. 3 is a conventional representation of a measuring instrument.

A single disk mounted within the influence of a rotary magnetic field and arranged either to rotate therewith or balanced by means of a spring according to the usual arrangement in recording or indicating meters may be used as indicated diagrammatically in Fig. 2, but I prefer to employ a set of two disks arranged as in astatic instruments, as shown in Figs. 1 and 3.

Referring to the drawings, A, B, represent two disks or cylinders of magnetic material, carried by a single arbor $r$, mounted in suitable bearings. These disks are subjected to the influence of rotary magnetic fields of equal intensity and like frequency, but of opposite rotation, as indicated by the arrows $a, b$.

In Fig. 3, I have shown the windings E, F, surrounding the disks, connected to the leads of a polyphase generator G. The rotary magnetic fields cause a magnetization of the disks and produce therein torques of opposite direction, but no tendency to rotation since they are equal. In order, however, to insure a definite position of the needle C, at the zero point on the graduated scale, I have indicated at D, a restraining spring. Surrounding one of the disks, as B, is an additional winding S, by means of which an auxiliary magnetic field may be superposed upon the rotary field due to the winding F, by connecting the leads L, L, to the source of current to be measured.

In Fig. 1, I have shown the coil S, connected in circuit with a telephone set, the receiver T, being connected directly with the leads L, L, and the transmitter M, in circuit with a battery P, being inductively connected through the transformer windings I, II. If now, a sound is emitted into the telephone transmitter, a feeble current induced in the transformer windings will traverse the line L, L, and coil S, disturbing the equilibrium of forces due to the oppositely rotating magnetic fields acting upon the disks, by modifying the field in which the coil S, is mounted and a decided variation will be indicated by the movement of the pointer C, over the graduated scale in the direction of the rotating field in which the coil S, is placed. The pointer will also indicate the exceedingly small current which will be produced by emitting the sound directly into the receiver T. It is evident that the instrument may be properly calibrated by testing with different currents of known values and frequencies and that the indications of the pointer may be recorded by providing the usual recording device.

The method above described may be utilized in numerous applications which will readily suggest themselves and which are comprised within the scope of my invention. Among other uses I may mention the following: As an extremely sensitive galvanometer, capable of measuring currents varying according to any law whatever; as a phono-telegraphic instrument for signaling to a distance and causing the operation of a mechanical device in accordance with the sound emitted at the transmitting station; as an instrument for signaling and recording at a distance the currents produced by the variations of thermic, meteorological or other conditions.

Having thus fully described my invention, what I declare as new and desire to secure by Letters-Patent of the United States, is:—

1. The method of measuring a variable electric current, which consists in causing such current to affect a rotatable member placed within the influence of a rotary magnetic field.

2. The method of measuring a variable electric current which consists in subjecting a rotatable magnetic body to the influence of a rotary magnetic field, and causing a deviation of the magnetic lag in said body by superposing thereon a field due to said variable current.

3. The method of measuring a variable electric current which consists in placing a rotatable member within the influence of a rotary magnetic field, superposing thereon a field due to said variable current, and measuring the deviation of the rotatable member.

4. The method of measuring a variable electric current which consists in subjecting a rotatable member to a rotary magnetic field, impressing thereon a field due to said variable current, and measuring the deviation of said member caused thereby.

5. The method of measuring a variable electric current which consists in subjecting a rotatable magnetic member to the torque due to a rotary magnetic field, restraining the movement of said member by an opposing torque, and disturbing the equilibrium by the influence of said variable current upon the rotatable member.

6. The method of measuring variable electric currents which consists in subjecting a rotatable magnetic member to equal opposing torques due to rotary magnetic fields, and disturbing the equilibrium of said member by the influence of said variable currents.

7. The method of measuring variable electric currents which consists in subjecting a rotatable magnetic member to equal opposing torques due to rotary magnetic fields, and affecting one of said rotary fields by the influence of said variable currents.

8. An instrument for measuring variable electric currents comprising a rotatable member, means for impressing thereon a rotary magnetic field, and means for causing said variable currents to affect said member.

9. An instrument for measuring variable electric currents comprising a rotatable magnetic member, means for impressing thereon a rotary magnetic field, means for opposing the torque due to said field, and means for causing said variable currents to affect said member.

10. An instrument for measuring a variable electric current comprising a rotatable magnetic member, means for impressing thereon substantially equal opposing torques due to rotary magnetic fields, and means for causing said variable current to disturb the equilibrium of said body.

11. An instrument for measuring a variable electric current comprising a rotatable member, means for impressing thereon substantially equal opposing torques due to rotary magnetic fields, means for causing said variable current to disturb the equilibrium of said body, and means for measuring the amount of movement caused thereby.

12. An instrument for measuring a variable electric current comprising a rotatable member having two magnetic portions, means for subjecting said magnetic portions to equal opposing torques respectively due to rotary magnetic fields, and means for disturbing the equilibrium of said rotatable member by subjecting one portion to a magnetic field due to said variable current.

In testimony whereof I affix my signature to this specification, in the presence of two witnesses.

RICCARDO ARNO.

Witnesses:
H. P. SMITH,
KARL SALVOTÉ.